No. 708,222. Patented Sept. 2, 1902.

T. GORDON.
INCANDESCENT GAS BURNER.
(Application filed July 26, 1901.)

(No Model.)

WITNESSES:
A. V. Groupe
S. Nolan

INVENTOR
Thomas Gordon
BY John R. Nolan
ATTORNEY

UNITED STATES PATENT OFFICE.

THOMAS GORDON, OF PHILADELPHIA, PENNSYLVANIA.

INCANDESCENT GAS-BURNER.

SPECIFICATION forming part of Letters Patent No. 708,222, dated September 2, 1902.

Application filed July 26, 1901. Serial No. 69,788. (No model.)

*To all whom it may concern:*

Be it known that I, THOMAS GORDON, a citizen of the United States, residing at the city of Philadelphia, in the county of Philadelphia, and State of Pennsylvania, have invented certain new and useful Improvements in Incandescent Gas-Burners, of which the following is a specification.

This invention relates to that class of gas-lamps in which compressed air and gas are commingled preparatory to their passage to and combustion at the burner-head. An objection heretofore to such lamps has been the annoying hissing sound caused by the ingress to the mixing-chamber of the air and gas through the inlet-orifices at the base of said chamber. To remedy this defect is the object of my invention, which, stated generally, consists, first, in the provision between the air-supply pipe and the mixing-chamber of an elongated annular air-duct, and, secondly, in the provision between the gas-supply pipe and the mixing-chamber of elongated ducts for the ingress of the gas to said chamber.

The invention also comprises novel features of construction and arrangements of parts, which will be hereinafter particularly described and claimed.

Figure 1:
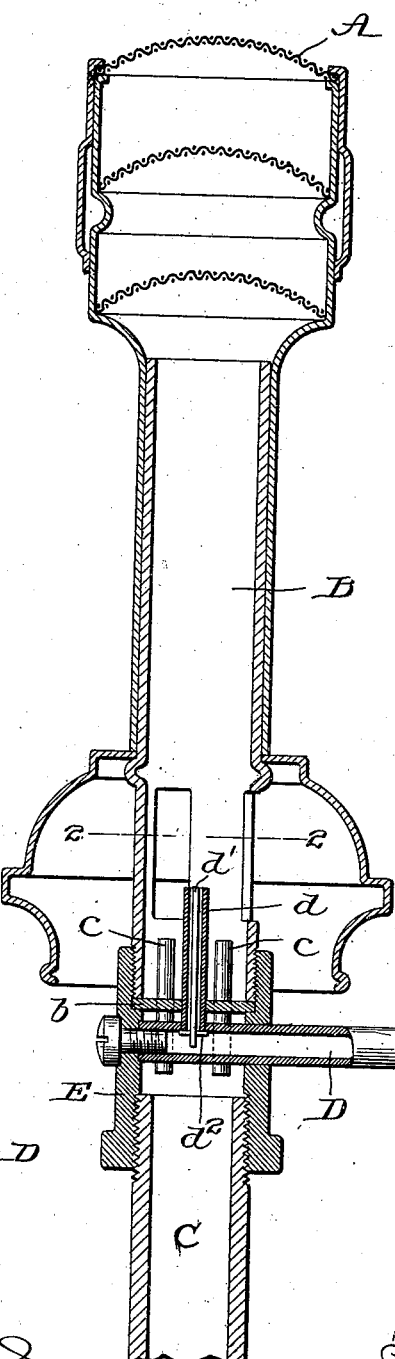
Figure 2:
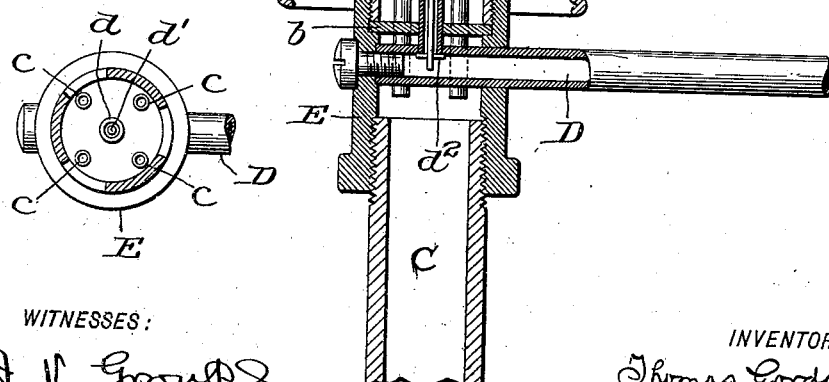

In the drawings, Figure 1 is a longitudinal section of an incandescent gas-burner embodying my invention. Fig. 2 is a transverse section as on the line 2 2 of Fig. 1.

A represents the burner-head, B the induction and mixing chamber below the same, and C D the gas and air supply pipes, respectively, having communication with the interior of the said chamber. In the present instance the gas-supply pipe is screwed onto the lower end of a coupling member E, which is screwed upon and depends from the body of the chamber B, and the air-supply pipe extends horizontally through the wall of the member, so as to lie intermediate the supply-pipe and the bottom of said chamber. This bottom comprises a diaphragm $b$, clamped in place by the member E. Rising centrally through the diaphragm is a tube $d$, the lower end of which opens into the air-supply pipe and the upper end communicates with the interior of the chamber B. Arranged axially within this tube is a stem or pin $d'$, between which and the inner wall of the tube is formed an annular duct for the passage of the air from the supply-pipe to the chamber B, this duct being of just sufficient area to permit the ingress of a predetermined volume of air to the said chamber. When an ordinary tube of sufficient fineness for the passage of a proper quantity of air is employed, a disagreeable hissing sound is occasioned by the passage of the air therethrough; but when a larger tube with an annular air-duct therein is provided, as above described, the objectionable noise is effectually obviated. To insure the axial position of the stem or pin within the tube during the passage of the air, and thus to provide for the uniformity of the annular duct, I set such stem or pin loosely within the tube and provide the former at its lower depending end with a cross-piece $d^2$. The compressed air in its passage through the tube supports the stem or pin and maintains it in the central position, the cross-piece abutting against the lower end of the tube and serving as a stop to limit the upward movement of the stem or needle.

Extending through the diaphragm are a series of elongated tubes $c$, which afford communication between the underlying gas-chamber and the interior of the chamber B. By the use of these tubes instead of the usual orifices I have discovered that the hissing of the gas in its passage to the mixing-chamber is also effectually obviated. I may add that not only do the devices above described overcome the hissing heretofore caused by the ingress of the air and gas to the induction and mixing chamber, but a more intimate and efficient commingling of the air and gas is had than heretofore.

I claim—

1. In a gas-burner, the combination with an induction and mixing chamber, and a gas-supply pipe having communication therewith, of an air-supply pipe, and means at the bottom of said chamber providing an elongated annular duct connecting the chamber with said air-supply pipe, the outlet or discharge portion of said duct being open and unobstructed.

2. In a gas-burner, the combination with the induction and mixing chamber and the gas-supply pipe having communication therewith, of the air-supply pipe, a tube leading therefrom to the said chamber, and a core n said tube, affording in the latter an annular duct having an open unobstructed outlet.

3. In a gas-burner, the combination with the induction and mixing chamber and the gas-supply pipe having communication therewith, of the air-supply pipe, a tube leading therefrom to the said chamber, and a loosely-mounted stem or pin in said tube.

4. In a gas-burner, the combination with the induction and mixing chamber, and the air-supply pipe having central communication with said chamber adjacent the bottom of the latter, of the gas-supply pipe, and the elongated gas-ingress tubes disposed in the bottom of the said chamber independently and laterally of the point of communication between the air-supply pipe and said chamber.

5. In a gas-burner, the combination with the induction and mixing chamber, of the gas-supply pipe, the elongated gas-ingress ducts in the bottom of said chamber, the air-supply pipe, and a centrally-disposed annular duct leading therefrom to the said chamber, said duct having an open unobstructed outlet.

6. In a gas-burner, the combination with an induction and mixing chamber, a gas-supply pipe, and an air-supply pipe, of elongated gas-ingress ducts in the bottom of said chamber, an elongated air-duct leading from the air-supply pipe to said chamber, and an axially-disposed stem or pin in said air-duct.

In testimony whereof I affix my signature in presence of two witnesses.

THOMAS GORDON.

Witnesses:
ANDREW V. GROUPE,
SADIE NOLAN.